US008582601B2

(12) United States Patent
Zeng et al.

(10) Patent No.: US 8,582,601 B2
(45) Date of Patent: Nov. 12, 2013

(54) TERMINAL ACCESS METHOD AND TERMINAL

(75) Inventors: Zhenzhou Zeng, Shenzhen (CN); Yong Ling, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 123 days.

(21) Appl. No.: 13/258,976

(22) PCT Filed: Dec. 18, 2009

(86) PCT No.: PCT/CN2009/075708
§ 371 (c)(1),
(2), (4) Date: Sep. 22, 2011

(87) PCT Pub. No.: WO2011/015014
PCT Pub. Date: Feb. 10, 2011

(65) Prior Publication Data
US 2012/0008602 A1    Jan. 12, 2012

(30) Foreign Application Priority Data
Aug. 6, 2009   (CN) .......................... 2009 1 0163643

(51) Int. Cl.
*H04J 3/16*   (2006.01)
(52) U.S. Cl.
USPC ............ 370/470; 370/229; 370/328; 370/476
(58) Field of Classification Search
USPC ......... 370/229, 230, 254, 328, 389, 458, 468, 370/470, 472, 474, 475, 476
See application file for complete search history.

(56) References Cited

U.S. PATENT DOCUMENTS

| 2003/0003867 | A1* | 1/2003 | Kawamura ...................... 455/41 |
| 2008/0057913 | A1* | 3/2008 | Sinha et al. ................ 455/414.1 |
| 2010/0034078 | A1* | 2/2010 | Jia et al. ......................... 370/210 |
| 2010/0067393 | A1* | 3/2010 | Sakimura et al. ............. 370/252 |
| 2010/0202354 | A1* | 8/2010 | Ho ................................. 370/328 |
| 2010/0246600 | A1* | 9/2010 | Das et al. ....................... 370/465 |
| 2011/0149770 | A1* | 6/2011 | Cimini et al. ................. 370/252 |
| 2011/0176446 | A1* | 7/2011 | Bourlas et al. ................ 370/252 |

FOREIGN PATENT DOCUMENTS

| CN | 1331524 A | 1/2002 |
| CN | 101047954 A | 10/2007 |
| CN | 101137119 A | 3/2008 |

OTHER PUBLICATIONS

International Search Report for International Application No. PCT/CN2009/075708, mailed May 6, 2010 (4 pages).
International Preliminary Report on Patentability for International Application No. PCT/CN2009/075708, issued Feb. 7, 2012 (5 pages).
Written Opinion of the International Searching Authority for International Application No. PCT/CN2009/075708, mailed May 6, 2010 (4 pages).

* cited by examiner

*Primary Examiner* — Kwang B Yao
*Assistant Examiner* — Nguyen Ngo
(74) *Attorney, Agent, or Firm* — Clark & Elbing LLP

(57) ABSTRACT

The present invention discloses a terminal access method and a terminal, wherein the method comprises: calculating a length of an access message body of an access message (201); constructing an access time-slot according to a configured length of an access message prefix and the length of the access message body (202); transmitting the access message prefix to a base station when the access time-slot is aligned (203); and transmitting the access message body to the base station (204). The present invention shortens the access time of the terminal, improves the access rate of the terminal and the utilization ratio of the access channel, increases the access capability of the system, and reduces the collision probability of access messages.

6 Claims, 2 Drawing Sheets

TERMINAL ACCESS METHOD AND TERMINAL

FIELD OF THE INVENTION

The present invention relates to communication field, and in particular to a terminal access method and a terminal.

BACKGROUND OF THE INVENTION

At present, the Code Division Multiple Access (CDMA) communication system protocol regulates that an access time-slot comprises the length of an access message prefix (PAM_SZ) and the length of an access message body (MAX_CAP_SZ), wherein the parameter MAX_CAP_SZ and the parameter PAM_SZ are transmitted by a base station to a terminal via an air interface message. The structural schematic diagram of the access time-slot is shown in FIG. 1, wherein the length of the access time-slot is the sum value of (1+PAM_SZ) and (3+MAX_CAP_SZ), and the unit of the sum value is frame. The access time-slot is embodied in time as the product of the length of the access time-slot and 20 milliseconds (ms). The time length for a terminal accessing a CDMA system mainly depends upon the access time-slot. The process of that the terminal accesses to the CDMA systems is as follows.

101, the terminal judges whether the access time-slot is aligned, if it is determined to be yes, 102 is performed.

102, the terminal transmits an access message prefix, i.e., after the access time-slot is aligned, the terminal transmits the access message prefix to the base station.

103, the terminal transmits an access message body.

After the access message prefix has been transmitted, the terminal constructs the access message body according to the configured value of the parameter MAX_CAP_SZ, and transmits the constructed access message body to the base station.

However, since the length of the access message body is the uniformly configured value of the parameter MAX_CAP_SZ, and the configured value of the parameter MAX_CAP_SZ is greater than the length of the actual access message body of the access message, the access time-slot becomes greater, and the number of the terminals accessed per unit of time becomes smaller, which results in a waste of an access channel.

SUMMARY OF THE INVENTION

The technical problem to be solved by the present invention is to provide a method for a terminal access and a terminal, which can solve the problem of a waste of an access channel resulted from an access time-slot getting greater in the prior art.

In order to solve the above problem, the present invention provides a terminal access method and a terminal, and the technical solution is as follows.

A terminal access method, comprising: calculating a length of an access message body of an access message; constructing an access time-slot according to a configured length of an access message prefix and the length of the access message body; transmitting the access message prefix to a base station when the access time-slot is aligned; and transmitting the access message body to the base station.

A terminal, comprising: a calculating module, configured to calculate a length of an access message body of an access message; a constructing module, configured to construct an access time-slot according to a configured length of an access message prefix and the length of the access message body; a first transmitting module, configured to transmit the access message prefix to a base station when the access time-slot is aligned; and a second transmitting module, configured to transmit the access message body to the base station.

By calculating in real time the length of an access message body of an access message, replacing the uniformly configured length of the access message body with the calculated length of the access message body so as to construct the access message body, and transmitting the constructed access message body to a base station, in the technical solution provided by the present invention, the access time of the terminal is shorten, the access rate of the terminal and the utilization ratio of the access channel is improved, the access capability of the system is increased, and the collision probability of access messages is reduced.

BRIEF DESCRIPTION OF THE ACCOMPANYING DRAWINGS

DETAILED DESCRIPTION OF THE EMBODIMENTS

By calculating in real time the length of an access message body of an access message, replacing the uniformly configured length of the access message body with the calculated length of the access message body so as to construct the access message body, and transmitting the constructed access message body to a base station, in the embodiments of the present invention, the access time of the terminal is shorten, the access rate of the terminal and the utilization ratio of the access channel is improved, the access capability of the system is increased, and the collision probability of access messages is reduced.

The technical solution of the present invention will be described in details hereinafter in conjunction with the accompany drawings and the preferable embodiments.

Figure 1:
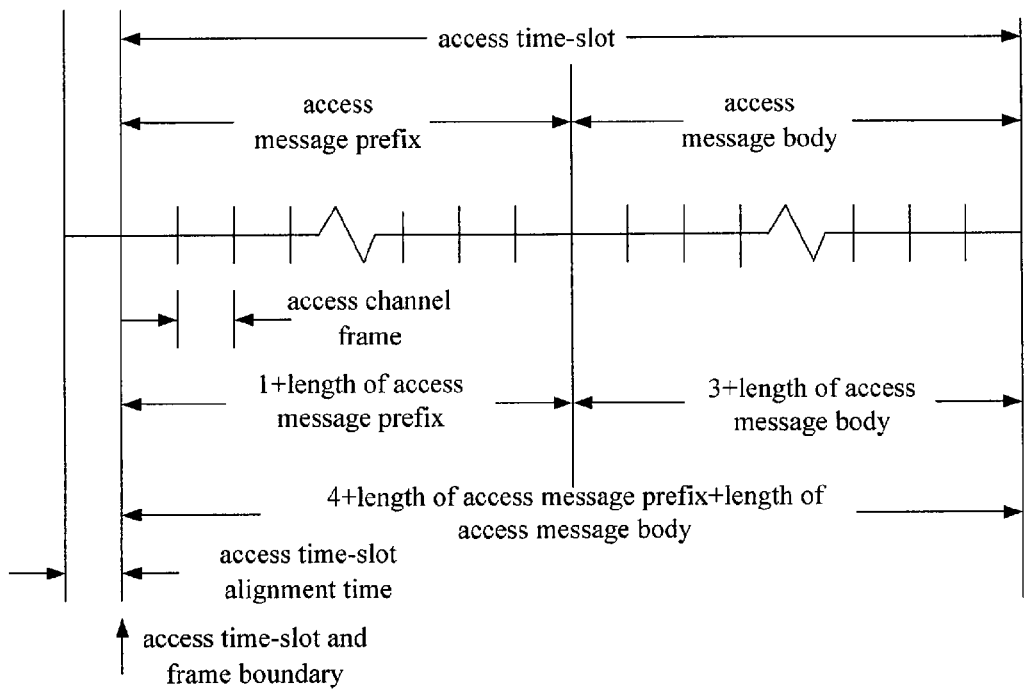
FIG. 1 is a structural diagram of an access time-slot provided in the prior art.
Figure 2:
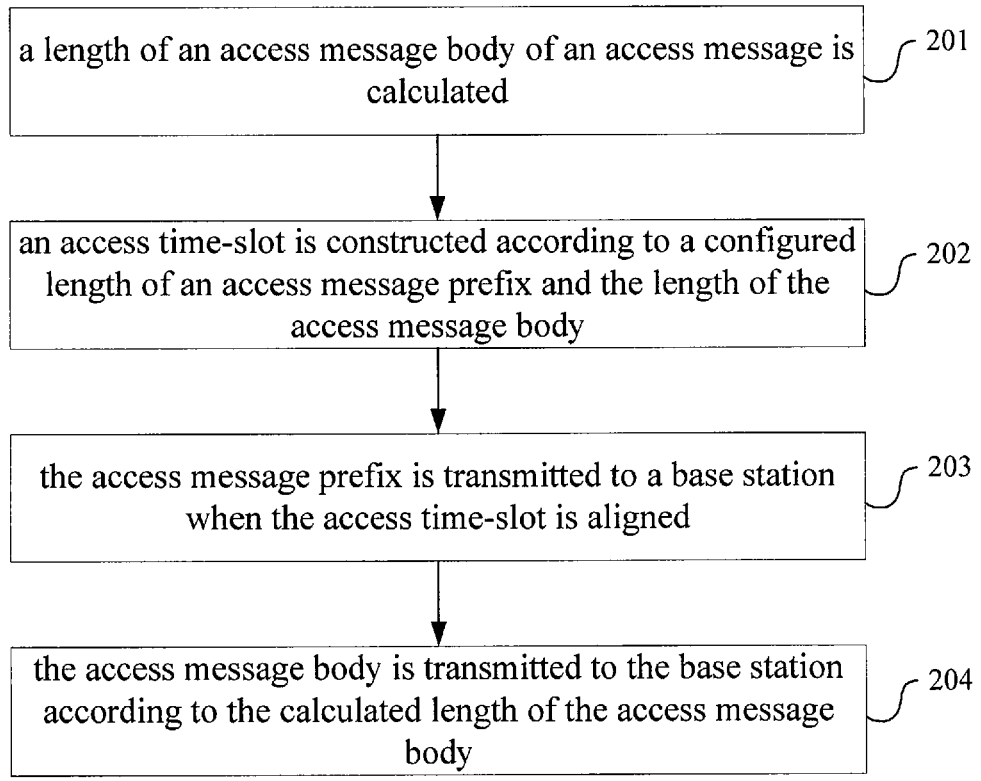
FIG. 2 is a method for terminal access provided by an embodiment of the present invention.

One embodiment of the present invention provides a method for a terminal access, as shown in FIG. 2, the method comprising the following steps.

201, a length of an access message body of an access message is calculated.

Specifically, the length of the access message body of the access message can be calculated according to a length of content of the access message body of the access message. For example, if the content of the access message body of the access message includes 500 bits of user data and 38 bits of other overheads, the length of the content of the access message body is 538 bits; the length of each frame configured corresponding to a certain transmission rate is 192 bits; and at this time, the length of the access message body is the integer of the value of 538/192, and the final result is 3.

202, an access time-slot is constructed according to a configured length of an access message prefix and the length of the access message body;

In the above, the configured length of the access message prefix is the length of the access message prefix of the access message which is obtained from an air interface message transmitted from the base station.

Specifically, the configured length of the access message body is replaced with the calculated length of the access message body; a first sum value of the length of the access message body and 3 is calculated; a second sum value of the configured length of the access message prefix and 1 is calculated; and the access time-slot is constructed according to the first sum value and the second sum value.

Preferably, the calculated length of the access message body is smaller than or equal to the configured length of the access message body.

It shall be explained that, in practice, the calculated length of the access message body can also be greater than the configured length of the access message body.

203, the access message prefix is transmitted to a base station when the access time-slot is aligned.

A start time point at which the terminal accesses a CDMA system is the boundary point of the access time-slot, i.e., the start time point of the access is integer times of the access time-slot. The length of access time-slot alignment time is a random value between 0 ms to ((1+PAM_SZ)+(3+MAX_CAP_SZ))×20 ms, and in practice, an average value is generally taken for the access time-slot alignment time, viz. the average time of the access time-slot alignment time is the half of the access time-slot alignment time, i.e., ((1+PAM_SZ)+(3+MAX_CAP_SZ))×10 ms.

204, the access message body is transmitted to the base station.

The above embodiment will be described in details as follows by a specific embodiment; however, the embodiment is not used to limit the scope of protection of the present invention.

It is assumed that the uniformly configured value of the parameter MAX_CAP_SZ is 7, the value of the parameter PAM_SZ is 3, the value of the parameter MAX_CAP_SZ and the value of the parameter PAM_SZ are obtained by the terminal from the air interface message transmitted from the base station, and the current access message is access message L, wherein the value of the parameter MAX_CAP_SZ and the value of the parameter PAM_SZ are only used to describe the embodiment, and the scope of protection of the present invention is not limited to these values.

The length of the access message body of the access message L is calculated to be 6 according to the length of the content of the access message body of the access message L. Specifically, the content of the access message body of the access message L includes 1000 bits of user data and 76 bits of other overheads; the length of each frame configured corresponding to a certain transmission rate is 192 bits; and at this time, the length of the access message body is the integer of the value of 1076/192, and the final result is 6.

In the above, the length of the access message body of the access message L is only used to describe the embodiment; and the scope of protection of the present invention is not limited to these values.

The configured value 7 of the parameter MAX_CAP_SZ is replaced with the calculated length of the access message body so as to construct the access message body whose length is (3+ the calculated length of the access message body)=(3+6)=9 (frame).

The value of the parameter PAM_SZ and 1 are summed to obtain a second sum value 4 (frames); and the value 9 of the length of the constructed access message body and the second sum value 4 are summed to obtain an access time-slot 13. The time length of the access time-slot is 13×20 ms=260 ms.

When the access time-slot is aligned, the terminal transmits the access message prefix to the base station.

In the above, the access time-slot alignment time is the half of the product of 13 and 20 ms, i.e., 130 ms.

After the access message prefix has been transmitted, the terminal transmits the constructed access message body to the base station according to the calculated length of the access message body.

Table 1 is a table of the relation between the configured value of the parameter MAX_CAP_SZ and the access time of the terminal.

TABLE 1

| PAM_SZ | MAX_CAP_SZ | access time-slot (frame) | average time of the access time-slot alignment time | access time (ms) | access time being shortened (ms) |
|---|---|---|---|---|---|
| m | N | 1 + m + 3 + n | (1 + m + 3 + n)*20/2 | | |
| 3 | 7 | 14 | 140 | 420 | |
| 3 | 6 | 13 | 130 | 390 | 30 |
| 3 | 5 | 12 | 120 | 360 | 60 |
| 3 | 4 | 11 | 110 | 330 | 90 |
| 3 | 3 | 10 | 100 | 300 | 120 |
| 3 | 2 | 9 | 90 | 270 | 150 |
| 3 | 1 | 8 | 80 | 240 | 180 |

In table 1, the parameter PAM_SZ is m whose value is 3, the parameter MAX_CAP_SZ is n whose value is 7, and at this time, the time during which the terminal accesses the system includes two parts, one is the time length of the access time-slot, and the other is the average time length of the access time-slot alignment time. Since the value of n is 7 and the value of m is 3, at this time, the time length of the access time-slot is ((1+m+3+n)×20)ms=280 ms, the average time of the access time-slot alignment is ((1+m+3+n)×20/2)ms=140 ms, and the access time of the terminal is (280+140)ms=420 ms, viz. the access time of the terminal is 420 ms by using the configured parameter MAX_CAP_SZ. Supposing that the calculated length of the access message body of the access message is 6, at this time, the time length of the access time-slot is ((1+m+3+n)×20)ms=260 ms, the average time of the access time-slot alignment is ((1+m+3+n)×20/2)ms=130 ms, the access time of the terminal is (260+130)ms=390 ms, and the access time of the terminal is shortened by 30 ms. By analogy, when the calculated length of the access message body of the access message is 1, the access time of the terminal is shortened by 180 ms. Those skilled in the art could understand that, supposing that the result of subtracting the calculated length of the access message body from the configured parameter MAX_CAP_SZ is K, the access time of the terminal can be shortened by (30*K)ms, wherein the value of K is an integer.

It can be concluded from the above embodiment and Table 1 that the method of the embodiments of the present invention can shorten the access time of the terminal, improves the access rate of the terminal and the utilization ratio of the access channel, increases the access capacity of the system, and helps to reduce the collision probability of the access message.

Figure 3:
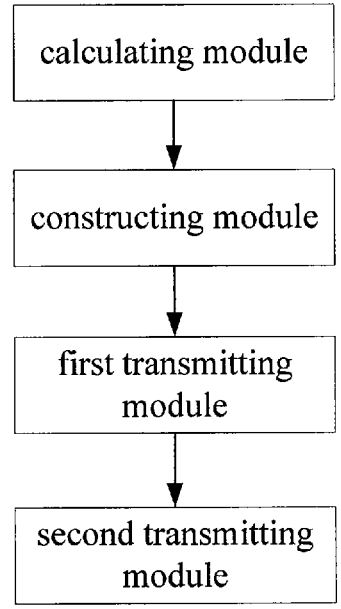
FIG. 3 is a structural diagram of a terminal provided by another embodiment of the present invention.

Based on the same inventive concept as the method embodiment, one embodiment of the present invention provides a terminal. As shown in FIG. 3, the terminal comprises:

a calculating module, configured to calculate a length of an access message body of an access message;

a constructing module, configured to construct an access time-slot according to a configured length of an access message prefix and the length of the access message body;

a first transmitting module, configured to transmit the access message prefix to a base station when the access time-slot is aligned; and a second transmitting module, configured to transmit the access message body to the base station.

Further, the calculating module is specifically configured to calculate the length of the access message body of the access message according to a length of content of the access message body of the access message.

Further, the constructing module is specifically configured to replace a configured length of the access message body with the calculated length of the access message body, calculate a first sum value of the length of the access message body and 3, calculate a second sum value of the length of the access message prefix and 1, and construct the access time-slot according to the first sum value and the second sum value.

Preferably, the calculated length of the access message body is smaller than or equal to the configured length of the access message body.

By calculating in real time the length of an access message body of an access message, replacing the uniformly configured length of the access message body with the calculated length of the access message body so as to construct the access message body, and transmitting the constructed access message body to a base station, in the technical solution provided by the present invention, the access time of the terminal is shorten, the access rate of the terminal and the utilization ratio of the access channel is improved, the access capability of the system is increased, and the collision probability of access messages is reduced.

What is claimed is:

1. A method for a terminal access, comprising:
   calculating a length of an access message body of an access message;
   constructing an access time-slot according to a configured length of an access message prefix and the length of the access message body;
   transmitting the access message prefix to a base station when the access time-slot is aligned; and
   transmitting the access message body to the base station;
   wherein said constructing the access time slot according to the length of the access message prefix and the length of the access message body comprises:
   replacing a configured length of the access message body with the calculated length of the access message body;
   calculating a first sum value of the length of the access message body and 3;
   calculating a second sum value of the length of the access message prefix and 1; and
   constructing the access time slot according to the first sum value and the second sum value.

2. The method according to claim 1, wherein the length of the access message body of the access message is calculated according to a length of content of the access message body of the access message.

3. The method according to claim 1, wherein the calculated length of the access message body is smaller than or equal to the configured length of the access message body.

4. A terminal, comprising:
   a calculating module, configured to calculate a length of an access message body of an access message;
   a constructing module, configured to construct an access time-slot according to a configured length of an access message prefix and the length of the access message body;
   a first transmitting module, configured to transmit the access message prefix to a base station when the access time-slot is aligned; and
   a second transmitting module, configured to transmit the access message body to the base station;
   wherein the constructing module is configured to replace a configured length of the access message body with the calculated length of the access message body;
   calculating a first sum value of the length of the access message body and 3;
   calculating a second sum value of the length of the access message prefix and 1; and
   constructing the access time slot according to the first sum value and the second sum value.

5. The terminal according to claim 4, wherein the calculating module is configured to calculate the length of the access message body of the access message according to a length of content of the access message body of the access message.

6. The terminal according to claim 4, wherein the calculated length of the access message body is smaller than or equal to the configured length of the access message body.

* * * * *